United States Patent

Nishio

[11] Patent Number: 5,253,306
[45] Date of Patent: Oct. 12, 1993

[54] METHOD OF MATCHING PATTERNS AND APPARATUS THEREFOR

[75] Inventor: Masami Nishio, Kagawa, Japan

[73] Assignee: Futec Inc., Takamatsu, Japan

[21] Appl. No.: 636,127

[22] Filed: Dec. 31, 1990

[30] Foreign Application Priority Data

Jan. 12, 1990 [JP] Japan ............................. 2-5632

[51] Int. Cl.$^5$ ............................................. G06K 9/48
[52] U.S. Cl. ............................................. 382/22; 382/8;
382/48; 358/101; 358/106; 358/107
[58] Field of Search ................ 382/8, 22, 34, 48;
358/101, 106, 107

[56] References Cited

U.S. PATENT DOCUMENTS

| | | | |
|---|---|---|---|
| 4,589,140 | 5/1986 | Bishop et al. | 382/8 |
| 4,648,053 | 3/1987 | Fridge | 364/551 |
| 4,692,943 | 9/1987 | Pietzsch et al. | 382/8 |
| 4,701,961 | 10/1987 | Hongo | 382/34 |
| 4,893,346 | 1/1990 | Bishop | 382/8 |
| 4,953,224 | 8/1990 | Ichinose et al. | 382/8 |

FOREIGN PATENT DOCUMENTS 2129546 5/1984 United Kingdom .

Primary Examiner—Jose L. Couso
Attorney, Agent, or Firm—Jacobson, Price, Holman & Stern

[57] ABSTRACT

A method for matching patterns includes the steps of optically scanning a master image and a to-be-recognized image and outputting master image data and to-be-recognized image data, extracting master outline data representing an outline of the master image from the master image data, extracting to-be-recognized outline data representing an outline of a to-be-recognized image from the to-be-recognized image data, performing an enlargement process for the to-be-recognized outline data to enlarge the to-be-recognized outline, thereby forming to-be-recognized outline data, and collating the master outline data with the to-be-recognized outline data, and if a portion of the master outline projects from the to-be-recognized outline, determining that the to-be-recognized image has a short-defect indicating an omission of the image 16 Claims, 3 Drawing Sheets

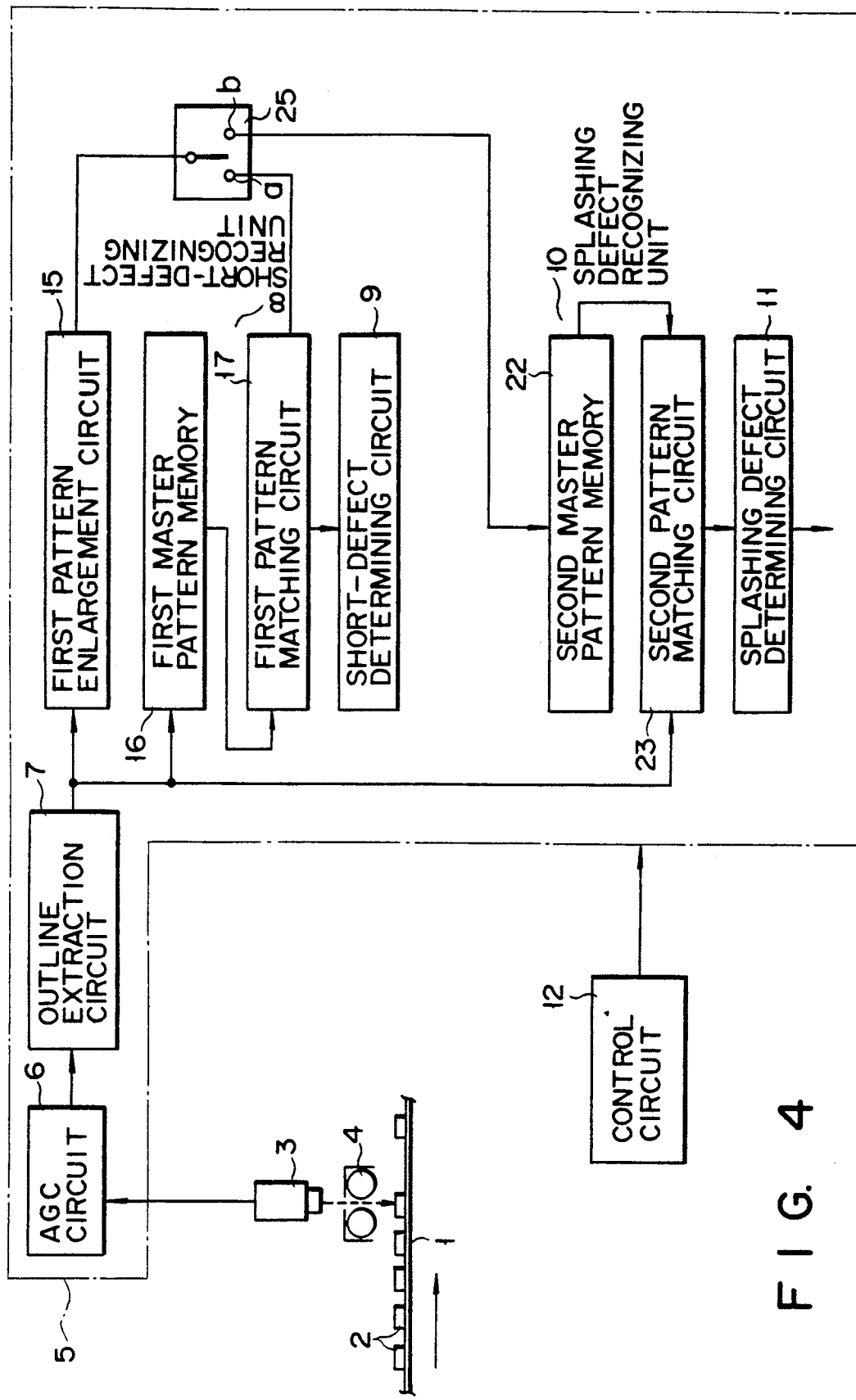
F I G. 4

METHOD OF MATCHING PATTERNS AND APPARATUS THEREFOR

BACKGROUND OF THE INVENTION

1. Field of the Invention

The present invention relates to a method of matching patterns and an apparatus therefore used in a checking system for checking the quality of offset sheet-fed printing or screen process printing performed on a molded product.

2. Description of the Related Art

A technique of checking the quality of a printed pattern or the like performed on a product by means of pattern matching is conventionally known, and this technique is performed as follows.

First, a product determined to be a good product by eye inspection or the like is prepared, and a to-be-checked object such as a printed pattern formed on the product is imaged by a television camera. An image signal from the camera is signal-processed, and outline data of the to-be-checked object is extracted. Enlarged outline data obtained by performing an enlargement process for the outline in the vertical and horizontal directions is stored as master pattern data in a memory. A slight error based on variations in to-be-checked objects or conveyance precision of products can be allowed by this enlargement process. Thereafter, a to-be-checked object of a to-be-checked product is imaged by the television camera. Outline data is extracted from an image signal corresponding to the to-be-checked object by an outline extraction circuit and compared with the master pattern data stored in the memory, thereby performing pattern matching. By such a conventional method of matching patterns, information for determining the quality of a to-be-checked object such as a printed pattern is obtained.

Defects encountered in a printed pattern are roughly classified into a short-defect and a splashing defect. In the short-defect, a portion of a printed pattern is omitted or becomes faint. In the splashing defect, splashed ink, dirt, or foreign matters are adhered on a portion other than a predetermined printed portion.

The above conventional technique is suitably used in detection of splashing defect information. Since, however, this conventional technique is based on the master pattern obtained by performing an enlargement process for the outline and an omitted portion of a printed pattern may be included in the master pattern, the technique is unsuitable to recognize short-defect information.

SUMMARY OF THE INVENTION

It is an object of the present invention to provide a method of matching patterns, which allows recognition of both a short-defect and a splashing defect.

According to the method of matching patterns of the present invention, image data of a prepared master is fetched in an outline extraction circuit, and outline data of the image is extracted. Master outline data obtained by the extraction is stored in a memory, and outline data of an image of a to-be-recognized object is extracted by the outline extraction circuit. A pattern enlargement process is performed for the extracted outline data to form a to-be-recognized pattern. This to-be-recognized pattern data and the master outline data are collated with each other.

According to the present invention, in order to detect both a short-defect and a splashing defect, image data of a prepared master is fetched in the outline extraction circuit, and outline data of the image is extracted. Master outline data obtained by the extraction is stored in the memory, and outline data of an image of a to-be-recognized object is extracted by the outline extraction circuit. This extracted outline data is enlargement-processed to form a first to-be-recognized pattern. Enlarged master pattern data obtained by performing an enlargement process for the master outline data of the master image extracted from the outline extraction circuit is stored in a second memory, and the outline data of the image of the to-be-recognized object is extracted by the outline extraction circuit to form a second to-be-recognized pattern. A first pattern matching process for collating the first to-be-recognized pattern with the master outline data and a second pattern matching process for collating the second to-be-recognized pattern data with the enlarged master pattern data are performed parallel to each other.

An apparatus of matching patterns according to the present invention comprises an outline extraction circuit for independently fetching image data of a prepared master and image data of a to-be-recognized object and extracting outline data of the images, a pattern enlargement circuit, connected to the output terminal of the outline extraction circuit, for performing an enlargement process for the extracted outline data, a first memory, connected to the output terminal of the outline extraction circuit, for storing the outline data extracted for the master image as master outline data, a first pattern matching circuit, connected to the output terminals of the first memory and the pattern enlargement circuit, for collating the master outline data with first to-be-recognized pattern data of the to-be-recognized object obtained by the pattern enlargement circuit, a second memory, connected to the output terminal of the pattern enlargement circuit, for storing enlarged master pattern data of the master image obtained by the pattern enlargement circuit, and a second pattern matching circuit, connected to the output terminals of the second memory and the outline extraction circuit, for collating the enlarged master pattern data of the master image with second to-be-recognized pattern data of the to-be-recognized object obtained by the outline extraction circuit.

In the present invention, master outline data serving as a comparison reference is outline data extracted from prepared master image data, and this master outline data is stored in the memory without being enlargement-processed. Subsequently, to-be-recognized pattern data to be compared with the master outline data is formed by performing an enlargement process for outline data of a to-be-recognized object. The two pattern data are collated with each other, and a portion of the master outline projecting from the to-be-recognized pattern in this collation is recognized as short-defect information.

In the present invention, when pattern matching is executed, splashing defect information is recognized parallel to recognition of short-defect information. In the recognition of splashing defect information, master enlarged pattern data formed by performing an enlargement process for the master outline data extracted from the master image data and stored in the memory is collated with outline (to-be-recognized pattern) data of the to-be-recognized object. In this collation, a portion of the to-be-recognized pattern projecting from the master enlarged pattern is recognized as splashing defect information.

In the present invention, after the outline extraction circuit extracts the outline data of the prepared master image, the pattern enlargement circuit pattern-enlarges the outline data to form enlarged master pattern data. This enlarged pattern data is stored in the second memory. Since the outline data of the master image is supplied to the first memory without being enlargement-processed parallel to the storage of the pattern data, the first memory stores the outline data of the master image as master outline data. After this storage, the outline extraction circuit extracts outline data of an image of a to-be-recognized object. This outline data is supplied to the second pattern matching circuit without being enlarged by the pattern enlargement circuit. This matching circuit collates the to-be-recognized outline data with the enlarged master pattern data read out from the second memory, thereby recognizing the presence/absence of splashing defect information. Since the outline data of the image of the to-be-recognized object is enlargement-processed by the pattern enlargement circuit and supplied to the first pattern matching circuit parallel to the collation, this matching circuit collates the to-be-recognized outline data with the outline data of the master image read out from the first memory, thereby recognizing the presence/absence of short-defect information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a block diagram of a pattern matching apparatus according to another embodiment of the present invention.

DETAILED DESCRIPTION OF THE PREFERRED EMBODIMENTS

Figure 1:
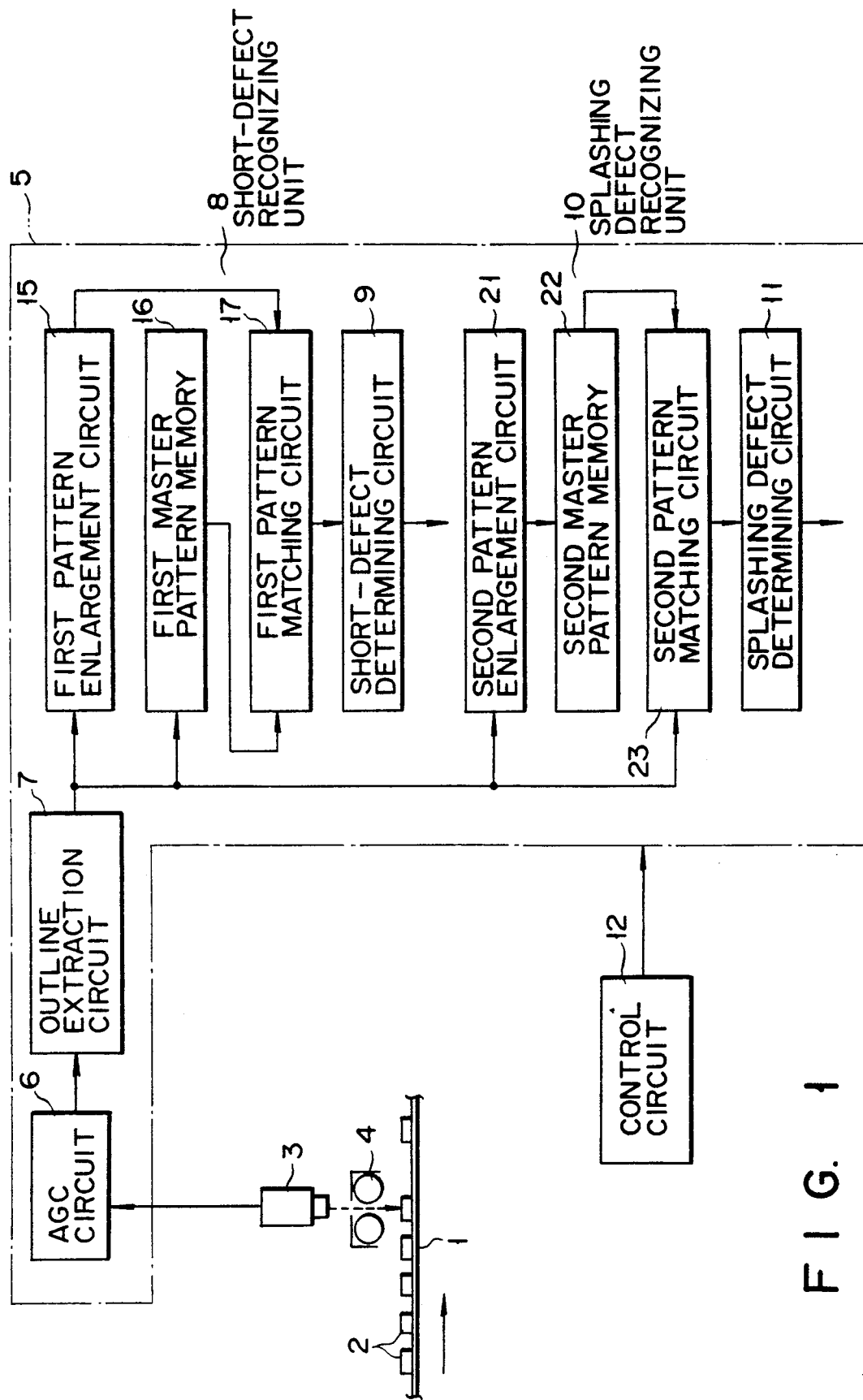
FIG. 1 is a block diagram showing an apparatus for carrying out a method of matching patterns according to an embodiment of the present invention.

Referring to FIG. 1, a conveyor 1 for a to-be-recognized object conveys a to-be-recognized object 2 having a printed pattern formed by, e.g., screen process printing on its surface in a direction indicated by an arrow. A television camera 3 is arranged to oppose a portion of the conveyor 1, and a field of view of the camera 3 is illuminated by a lighting device 4 as needed.

An electronic camera incorporating a linear array image sensor is used as the camera 3 and scans the printed pattern on the object 2 along a direction perpendicular to a conveyance direction of the conveyor 1. Picture (image) information output from the camera 3 is processed by a defect detecting device 5 shown in FIG. 1, and the quality of the printed pattern on the object 2 is checked accordingly.

The defect detecting device 5 comprises a AGC circuit 6, an outline extraction circuit 7, a short-defect recognizing unit 8, a short-defect determining circuit 9, a splashing defect recognizing unit 10, a splashing defect determining circuit 11, and a control circuit 12.

The AGC circuit 6 is connected to the output terminal of the television camera 3 and used to maintain a transmission output constant with respect to a gain variation in the entire defect detecting device 5. The outline extraction circuit 7 is connected to the output terminal of the AGC circuit 6. The outline extraction circuit 7 constituted by a differentiation circuit fetches all of signals output from the camera 3 and emphasizes changes in signals, thereby extracting outline data of the image.

Figure 2:
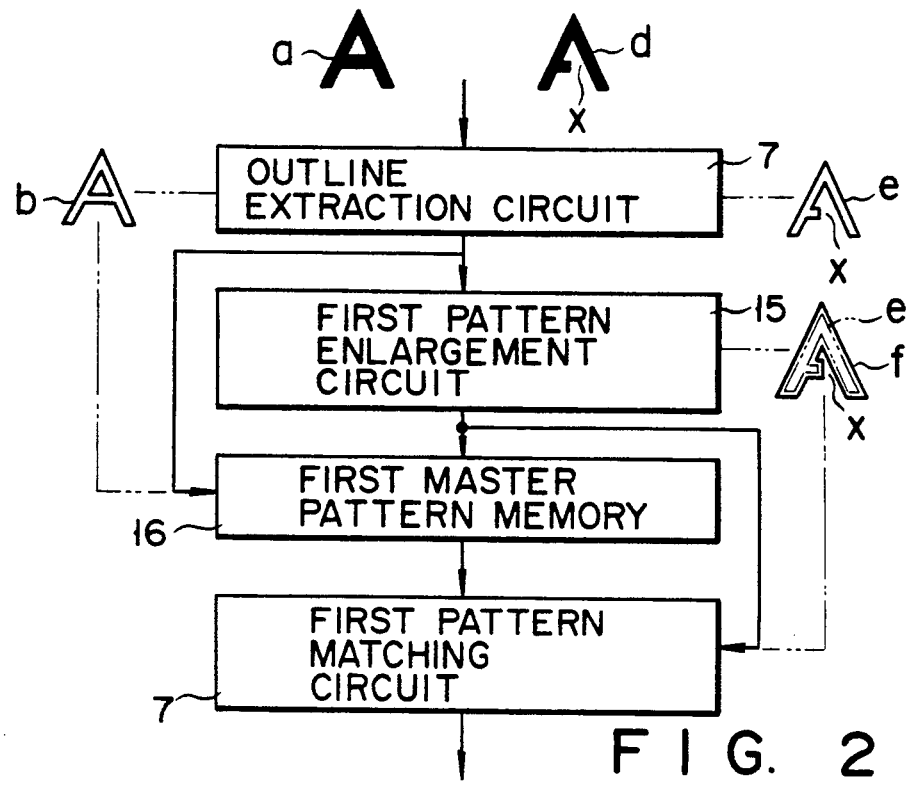
FIG. 2 is a block diagram showing a relationship between an arrangement of a short-defect recognizing unit for recognizing short-defect information and various types of patterns.

As shown in FIGS. 1 and 2, the short-defect recognizing unit 8 is constituted by a first pattern enlargement circuit 15, a first master pattern memory 16, and a first pattern matching circuit 17. The first pattern enlargement circuit 15 is connected to the output terminal of the outline extraction circuit 7. The pattern enlargement circuit 15 performs an enlargement process for data concerning an outline of an image in the vertical and horizontal directions in order to allow an error based on a variation in printed pattern of the to-be-recognized object 2 and precision of the conveyor 1, and its enlargement size can allow a slight error based on an initial variation or conveyance precision of products. This enlargement size is designated upon initialization. The pattern enlargement circuit 15 performs an enlargement process of the outline pattern to form a to-be-recognized pattern. Note that the outline extraction circuit, the pattern enlargement circuit, and the like are described in U.S. patent application No. 07/208,097 (patented).

The first master pattern memory 16 is connected to the output terminal of the outline extraction circuit 7 and can be subjected to both write and read operations. The pattern memory 16 stores master outline data extracted by the outline extraction circuit 7 from a product determined as a good product by eye inspection or another suitable inspection. While to-be-recognized objects 2 of the same type are inspected, the memory 16 does not change but keeps the stored outline data.

The first pattern matching circuit 17 is connected to the output terminals of the first pattern enlargement circuit 15 and the first master pattern memory 16. The matching circuit 17 collates the master outline data read out from the first master pattern memory 16 with the to-be-recognized pattern data obtained by the first pattern enlargement circuit 15 and checks whether the two patterns coincide with each other.

The short-defect determining circuit 9 is connected to the output terminal of the first pattern matching circuit 17. The short-defect determining circuit 9 checks whether the size of defect information recognized by the short-defect recognizing unit 8 indicates a defect. Note that the size of a defect is set in the determining circuit 9 upon initialization.

Figure 3:
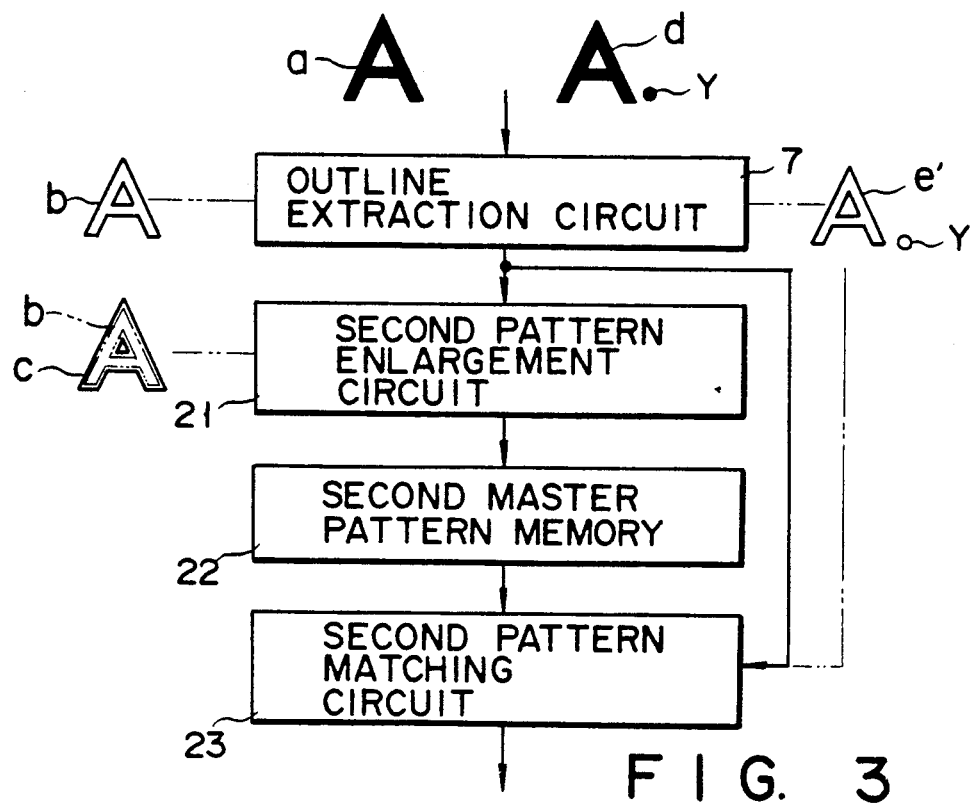
FIG. 3 is a block diagram showing a relationship between an arrangement of a splashing defect recognizing unit for recognizing splashing defect information and various types of patterns.

As shown in FIGS. 1 and 3, the splashing defect recognizing unit 10 is constituted by a second pattern enlargement circuit 21, a second master pattern memory 22, and a second pattern matching circuit 23.

The second pattern enlargement circuit 21 is connected to the output terminal of the outline extraction circuit 7. The second pattern enlargement circuit 21 has the same arrangement as that of the first pattern enlargement circuit 15 and performs an enlargement process for outline data to enlarge an outline, thereby forming enlarged master pattern data.

The second master pattern memory 22 is connected to the output terminal of the second pattern enlargement circuit 21. This memory 22 can also be subjected to both write and read operations. The memory 22 stores enlarged master pattern data extracted from a product determined as a good product by eye inspection or another suitable inspection and processed by the circuit 21. While to-be-recognized objects 2 of the same type are inspected, the enlarged master pattern data stored in the memory 16 is kept unchanged.

The second pattern matching circuit 23 is connected to the output terminals of the outline extraction circuit 7 and the second master pattern memory 22. The matching circuit 23 collates the enlarged master pattern data read out from the second master pattern memory 22 with the outline data of the to-be-recognized object 2 obtained by the outline extraction circuit 7 and checks whether the two pattern data coincide with each other.

The splashing defect determining circuit 11 is connected to the output terminal of the second pattern matching circuit 23. The second pattern matching circuit 23 checks whether the size of defect information recognized by the splashing defect recognizing unit 10 indicates a defect. Note that the size of a defect is set in the determining circuit 11 upon initialization.

The control circuit 12 controls operations of the entire apparatus, i.e., the AGC circuit 6, the outline extraction circuit 7, the short-defect recognizing unit 8, the short-defect determining circuit 9, the splashing defect recognizing unit 10, and the splashing defect determining circuit 11.

An operation of detecting a defect by using the apparatus having the above arrangement will be described below.

After a necessary initialization operation e.g. setting of the defect size and so on is performed, a printed pattern of a product determined as a good product by eye inspection or another suitable inspection is imaged by the television camera 3, and outline data is extracted from image data of the good product (master) by the outline extraction circuit 7. The extracted outline data is stored in the short-defect recognizing unit 8 and the splashing defect recognizing unit 10, as shown in FIGS. 2 and 3.

More specifically, in the short-defect recognizing unit 8, master image data output from the outline extraction circuit 7 and indicated by reference symbol a in FIG. 2, e.g., outline (b) data of a character A is stored as master outline data in the first master pattern memory 16. In the splashing defect recognizing unit 10, the outline (b) data of the master image A output from the outline extraction circuit 7 and indicated by a in FIG. 3 is enlargement-processed by the second pattern enlargement circuit 21, and enlarged master pattern (c) data obtained by this enlargement process is stored in the second master pattern memory 22.

After pattern setting according to the master image is performed, to-be-recognized objects 2 are sequentially conveyed to the field of view of the television camera 3 by the conveyor 1 and imaged. When defect image (d) data output from the camera 3 is input to the outline extraction circuit 7 via the AGC circuit 6, outline (e) data is extracted from the image (d) data by the outline extraction circuit 7 and supplied to the short-defect recognizing unit 8 and the splashing defect recognizing unit 10.

In the short-defect recognizing unit 8, therefore, the outline (e) data according to the to-be-recognized object 2 output from the outline extraction circuit 7 as shown in FIG. 2 is enlargement-processed by the first pattern enlargement circuit 15. To-be-recognized pattern (f) data obtained by the enlargement process is supplied to the first pattern matching circuit 17. The to-be-recognized pattern (f) data is input to the circuit 17 in synchronism with a read operation of the master outline (b) data corresponding to the master image A from the first master pattern memory 16 to the first pattern matching circuit 17, and the two patterns are collated with each other.

As a result, if the image d has a short-defect X (this defect X is larger than an enlargement size set in the enlargement circuit 15) as shown in FIG. 2, a portion of the outline b corresponding to the master image projects from the enlarged to-be-recognized pattern f. The first pattern matching circuit 17 recognizes this projecting portion as short-defect information.

This defect information is supplied to the short-defect determining circuit 9, and the circuit 9 checks whether the defect information is a true defect. This determination is performed on the basis of whether the input defect information has a size larger than a predetermined size.

The outline (e) data of the image (d) corresponding to the to-be-recognized object 2 supplied to the splashing defect recognizing unit 10 is directly supplied to the second pattern matching circuit 23 without being enlargement-processed. Outline (e') data corresponding to the object 2 is input to the circuit 23 in synchronism with a read operation of the enlarged master pattern (c) data corresponding to the master image A from the second master pattern memory 22 to the second pattern matching circuit 23, and the two patterns are collated with each other.

If the image d has a splashing defect Y as shown in FIG. 3, therefore, a portion of an outline e' corresponding to the to-be-recognized object 2 projects from the enlarged master pattern c. The second pattern matching circuit 23 recognizes this projecting portion as splashing defect information. This defect information is supplied to the splashing defect determining circuit 11, and the circuit 11 checks whether the defect information is a true defect. Similar to the determination of short-defect information, the determination of splashing defect information is performed on the basis of whether the input defect information has a size larger than a predetermined size.

Although the pattern enlargement circuit is provided for each recognizing unit corresponding to the type of defect in the above embodiment, a single pattern enlargement circuit 15 may be commonly used for the two recognizing units 8 and 10 as shown in FIG. 4. According to this embodiment, a single pattern enlargement circuit 15 is connected to a selector switch 25. The contacts a and b of the selector switch 25 are connected to the first pattern matching circuit 17 of the short-defect recognizing unit 8 and the second master pattern memory 22 of the splashing defect recognizing unit 10, respectively.

In this pattern matching apparatus, at first the selector switch 25 is switched to the contact b, and the outline (b) data of the master image is enlargement-processed by the pattern enlargement circuit 15. The enlarged master pattern (c) output from the pattern enlargement circuit 15 is stored in the second pattern memory 22 through the selector switch 25. The stored master pattern (c) data is used for collating with each of the to-be-recognized pattern (e') data sequentially input from the outline extraction circuit 7.

After the enlarged master pattern (c) data is stored in the second master pattern memory 22, the selector switch 25 is switched to the contact a. Then, the pattern enlargement circuit 15 enlargement-processes the to-be-recognized pattern (e) data sequentially input from the outline extraction circuit 7. The enlarged to-be-recognized pattern (f) data is input to the first pattern matching circuit 17 through the switch 25 and collated with the first master pattern (b) data stored in the first pattern memory 16.

According to the embodiment of FIG. 4, the single pattern enlargement circuit 15 enlargement-processes once the master outline (b) data for storing in the second master pattern memory 22, and then is used for enlargement-processing the outline (e) data of the to-be-recognized image data sequentially produced from the outline extraction circuit 7.

According to the pattern matching method of the present invention described above, an outline pattern extracted from a prepared master image is stored as a master outline, and this master outline is collated with a to-be-recognized pattern formed by performing an enlargement process for an outline pattern obtained for a to-be-recognized object. In this collation, since a portion of the master outline projecting from the to-be-recognized pattern is recognized as defect information, a short-defect can be recognized.

An outline extracted from a prepared master image is stored as a master outline and collated with a to-be-recognized pattern formed by enlarging the outline of a to-be-recognized object, and a portion of the master outline projecting from the to-be-recognized pattern is recognized as defect information in this collation. In addition, parallel to this process, an enlarged master pattern formed by enlarging the outline extracted from the master image is stored, and the outline of the to-be-recognized object is directly collated with the stored enlarged master pattern. In this collation, a portion of the to-be-recognized pattern projecting from the enlarged master pattern can be recognized as defect information. Therefore, both the short-defect and splashing defect information can be recognized parallel to each other.

Since the pattern matching apparatus the present invention comprises the outline extraction circuit, the pattern enlargement circuit, the first and second memories, and the first and second pattern matching circuits, it is capable of recognizing both of short-defect and splashing defect information parallel to each other.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A method of matching patterns, which is used for detecting a defect in a printed pattern on printed matter, comprising the steps of:
    a step of optically scanning a reference printed pattern having an outline and a to-be-recognized printed pattern having an outline to obtain first and second pattern data corresponding respectively to the reference printed pattern and the to-be-recognized printed pattern;
    a step of extracting master first outline data representing the outline of the reference printed pattern from the first pattern data;
    a step of extracting second outline data representing the outline of the to-be-recognized image from the second pattern data;
    a step of subjecting the second outline data to an enlargement process, for enlarging the outline of the to-be-recognized printed pattern, and for forming third outline data corresponding to an enlarged to-be-recognized outline; and
    a step of collating the first outline data with the third outline data, to output defect information indicating that the to-be-recognized printed pattern contains a defect when the outline of the reference printed pattern mismatches with the outline of the enlarged to-be-recognized printed pattern.

2. A method according to claim 1, wherein said collating step includes a step of checking whether the defect information is true defect information.

3. A method according to claim 1, wherein said collating step comprises a step of fetching the first outline data and the third outline data in synchronism with each other, and a step of comparing the first and third data with each other.

4. A method of matching patterns, which is used for detecting a defect in a printed pattern on printed matter, comprising:
    a first step of optically scanning a reference printed pattern having an outline and a to-be-recognized printed pattern having an outline, to obtain first and second pattern data corresponding respectively to the reference printed pattern and the to-be-recognized printed pattern;
    a second step of extracting first outline data representing the outline of the reference printed pattern from the first pattern data;
    a third step of extracting second outline data representing the outline of the to-be-recognized printed pattern from the second pattern data;
    a fourth step of subjecting to the first and second outline data an enlargement process to enlarge the outline of the reference printed pattern and the outline of the to-be-recognized printed pattern and to form third and fourth outline data corresponding respectively to an enlarged outline of the reference printed pattern and an enlarged outline of the to-be-recognized printed pattern;
    a fifth step of collating the first outline data with the fourth outline data, to output first defect information indicating that the to-be-recognized printed pattern contains a short-defect indicating an omission of a part of the to-be-recognized printed pattern when the outline of the reference printed pattern mismatches with the outline of the enlarged to-be-recognized printed pattern; and a sixth step of collating the third outline data with the second outline data, to output second defect information indicating that the to-be-recognized printed pattern contains a splashing defect indicating an inclusion of a printed pattern regardless of the to-be-recognized printed pattern when the outline of the enlarged reference printed pattern mismatches with the outline of the to-be-recognized printed pattern.

5. A method according to claim 4, wherein said fifth and sixth steps respectively include steps of checking whether the first and second defect information are true defect information.

6. A method according to claim 4, wherein said fifth step comprises a step of fetching the first outline data and the fourth outline data in synchronism with each other and comparing them with each other, and said sixth step comprises a step of fetching the third outline data and the second outline data in synchronism with each other and comparing them with each other.

7. An apparatus for matching patterns, which is used for detecting a defect in a printed pattern on printed matter, comprising:

pattern data output means for optically scanning a reference printed pattern having an outline and a to-be-recognized printed pattern having an outline and outputting first and second pattern data;

outline data output means for extracting and outputting first outline data representing the outline of the reference printed pattern from the first pattern data, and for extracting and outputting second outline data representing the outline of the to-be-recognized printed pattern from the second pattern data;

enlarged outline data output means for subjecting the second outline data to an enlargement process to enlarge the outline of the to-be-recognized printed pattern, and outputting third outline data representing an enlarged outline of the to-be-recognized printed pattern; and collating means for collating the first outline data with the third outline data, to output defect information indicating that the to-be-recognized printed pattern contains a defect when the outline of the reference printed pattern mismatches with the outline of the enlarged to-be-recognized printed pattern.

8. An apparatus according to claim 7, wherein said collating means includes a determining circuit for checking whether the defect information is true defect information.

9. An apparatus according to claim 7, wherein said collating means comprises a pattern matching circuit for fetching the first outline data and the third outline data in synchronism with each other and comparing them with each other.

10. An apparatus according to claim 7, wherein said outline data output means has memory means for storing the first outline data, and said collating means comprises a pattern matching circuit for comparing the first outline data read out from said memory means with the third outline data input from said enlarged outline data output means in synchronism with the read operation of the first outline data.

11. An apparatus according to claim 7, wherein said image data output means comprises image sensor means for optically scanning a plurality of printed materials each having a predetermined printed pattern corresponding to the to-be-recognized printed pattern.

12. An apparatus for matching patterns, which is used for detecting a defect in a printed pattern on printed matter, comprising:

pattern data output means for optically scanning a reference pattern having an outline and a to-be-recognized pattern having an outline and outputting first and second pattern data corresponding respectively to the reference pattern and the to-be-recognized pattern;

outline data output means for extracting and outputting first outline data representing the outline of the reference pattern from the first pattern data, and for extracting and outputting second outline data representing the outline of the to-be-recognized pattern from the second pattern data;

enlargement means for subjecting the first and second outline data to an enlargement process to enlarge the outlines of the reference and to-be-recognized patterns and output third and fourth outline data corresponding respectively to enlarged outlines of the reference and to-be-recognized patterns;

first collating means for collating the first outline data with the fourth outline data, and outputting first defect information indicating that the to-be-recognized printed pattern contains a short-defect indicating an omission of a part of the to-be-recognized printed pattern when the outline of the reference printed pattern mismatches with the outline of the enlarged to-be-recognized printed pattern; and second collating means for collating the third outline data with the second outline data, and outputting second defect information indicating that the to-be-recognized printed pattern contains a slashing defect indicating an inclusion of a printed pattern regardless of the to-be-recognized printed pattern when the outline of the enlarged reference printed pattern mismatches with the outline of the to-be-recognized printed pattern.

13. An apparatus according to claim 12, wherein said first and second collating means respectively include first and second determining circuits for checking whether the first and second defect information are true defect information.

14. An apparatus according to claim 12, wherein said first collating means comprises a first pattern matching circuit for fetching the first outline data and the fourth outline data in synchronism with each other and comparing them with each other, and said second collating means comprises a second pattern matching circuit for fetching the third outline data and the second outline data in synchronism with each other and comparing them with each other.

15. A method of matching patterns, which is used for detecting a defect in a pointed pattern on printed matter, comprising:

a first pattern matching process including a step of fetching master pattern data corresponding to a master pattern having an outline into outline extracting means, to extract master pattern outline data corresponding to the outline of the master pattern from the master pattern data, a step of storing the master pattern outline data obtained by the extraction into memory means, a step of extracting to-be-recognized pattern outline data corresponding to an outline of a to-be-recognized printed pattern from to-be-recognized printed pattern data corresponding thereto by said outline extracting means, a step of subjecting the extracted to-be-recognized pattern outline data to a pattern enlargement process to form enlarged to-be-recognized pattern outline data corresponding to an enlarged to-be-recognized pattern, and a step of collating the enlarged to-be-recognized outline data with the master pattern outline data; and a second pattern matching process including a step of subjecting the master pattern outline data to the pattern enlargement process to form an enlarged master pattern outline data, a step of storing the master pattern outline data into second memory means, a step of extracting the to-be-recognized pattern outline data by said outline extracting means, and collating the to-be-recognized pattern outline data with the enlarged master pattern outline data, wherein said first and second pattern matching processes are performed parallel to each other.

16. An apparatus for matching pattern, which is used for detecting a defect in a printed pattern or printed matter, comprising:

outline extracting means for independently fetching master pattern data and to-be-recognized pattern data corresponding respectively to a master pattern and a to-be-recognized pattern and extracting master pattern outline data and to-be-recognized pattern outline data corresponding to outlines of the master and to-be-recognized patterns, respectively, from master pattern data and to-be-recognized pattern data;

pattern enlargement processing means, connected to said outline extracting means, for subjecting the extracted master and to-be-recognized pattern outline data to an enlargement process to form enlarged master and to-be-recognized pattern outline data;

first memory means, for storing the master pattern outline data;

first pattern matching means, connected to output terminals of said first memory means and said pattern enlargement processing means, for collating the master pattern outline data with the enlarged to-be-recognized pattern outline data;

second memory means, connected to the output terminal of said pattern enlargement processing means, for storing the enlarged master pattern outline data; and second pattern matching means, connected to output terminals of said second memory means and said outline extracting means, for collating the enlarged master patter outline data with the to-be-recognized pattern outline data obtained by said outline extracting means.

* * * * *